(12) United States Patent
Hilliges et al.

(10) Patent No.: US 9,891,704 B2
(45) Date of Patent: Feb. 13, 2018

(54) AUGMENTED REALITY WITH DIRECT USER INTERACTION

(71) Applicant: Microsoft Technology Licensing, LLC, Redmond, WA (US)

(72) Inventors: Otmar Hilliges, Cambridge (GB); David Kim, Cambridge (GB); Shahram Izadi, Cambridge (GB); David Molyneaux, Oldham (GB); Stephen Edward Hodges, Cambridge (GB); David Alexander Butler, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/390,632

(22) Filed: Dec. 26, 2016

(65) Prior Publication Data

US 2017/0109938 A1   Apr. 20, 2017

Related U.S. Application Data

(63) Continuation of application No. 12/940,322, filed on Nov. 5, 2010, now Pat. No. 9,529,424.

(51) Int. Cl.
*G06F 3/01* (2006.01)
*G06T 19/00* (2011.01)
(Continued)

(52) U.S. Cl.
CPC .......... *G06F 3/011* (2013.01); *G02B 27/0101* (2013.01); *G06F 3/012* (2013.01);
(Continued)

(58) Field of Classification Search
CPC ........ G02B 27/0101; G02B 2027/0138; G02B 2027/014; G02B 2027/0145; G06F 3/017;
(Continued)

(56) References Cited

U.S. PATENT DOCUMENTS 5,588,098 A   12/1996  Chen et al.
5,589,980 A   12/1996  Bass et al.
(Continued)

OTHER PUBLICATIONS

Benko, et al., "Depth Touch: Using Depth-Sensing Camera to Enable Freehand Interactions On and Above the Interactive Surface", <<http://research.microsoft.com/en-us/um/people/benko/publications/2009/DepthTouch_T R_final.pdf>>, Microsoft Corporation, Microsoft Research, Technical Report MSR-TR-2009-23, Mar. 2009, pp. 1-8.

(Continued)

*Primary Examiner* — Jwalant Amin

(57) ABSTRACT

Augmented reality with direct user interaction is described. In one example, an augmented reality system comprises a user-interaction region, a camera that captures images of an object in the user-interaction region, and a partially transparent display device which combines a virtual environment with a view of the user-interaction region, so that both are visible at the same time to a user. A processor receives the images, tracks the object's movement, calculates a corresponding movement within the virtual environment, and updates the virtual environment based on the corresponding movement. In another example, a method of direct interaction in an augmented reality system comprises generating a virtual representation of the object having the corresponding movement, and updating the virtual environment so that the virtual representation interacts with virtual objects in the virtual environment. From the user's perspective, the object directly interacts with the virtual objects.

20 Claims, 7 Drawing Sheets

(51) Int. Cl.
  *G02B 27/01* (2006.01)
  *H04N 13/04* (2006.01)
  *G06F 3/03* (2006.01)

(52) U.S. Cl.
  CPC .............. *G06F 3/013* (2013.01); *G06F 3/017* (2013.01); *G06T 19/006* (2013.01); *G02B 2027/014* (2013.01); *G02B 2027/0138* (2013.01); *G02B 2027/0145* (2013.01); *G06F 3/0304* (2013.01); *H04N 13/04* (2013.01); *H04N 13/0468* (2013.01)

(58) Field of Classification Search
  CPC .......... G06F 3/011; G06F 3/012; G06F 3/013; G06F 3/0304; G06T 19/006; H04N 13/04; H04N 13/0468
  See application file for complete search history.

(56) References Cited

U.S. PATENT DOCUMENTS

| | | | |
|---|---|---|---|
| 6,137,457 A | 10/2000 | Tokuhashi et al. | |
| 6,154,723 A | 11/2000 | Cox et al. | |
| 6,426,745 B1 | 7/2002 | Isaacs et al. | |
| 6,822,643 B2 | 11/2004 | Matsui et al. | |
| 7,058,896 B2 | 6/2006 | Hughes | |
| 7,493,153 B2 | 2/2009 | Ahmed et al. | |
| 7,576,727 B2 | 8/2009 | Bell | |
| 7,676,356 B2 | 3/2010 | Carmel et al. | |
| 7,997,723 B2* | 8/2011 | Pienimaa | G02B 27/0172 351/158 |
| 8,230,367 B2 | 7/2012 | Bell et al. | |
| 8,584,026 B2 | 11/2013 | Lynk et al. | |
| 8,762,861 B2 | 6/2014 | Hyndman | |
| 2003/0085866 A1* | 5/2003 | Bimber | G05B 19/186 345/156 |
| 2003/0227470 A1 | 12/2003 | Yakup et al. | |
| 2004/0135744 A1 | 7/2004 | Bimber et al. | |
| 2004/0183775 A1* | 9/2004 | Bell | G06F 3/011 345/156 |
| 2005/0237317 A1* | 10/2005 | Cok | G06F 3/0421 345/207 |
| 2007/0040903 A1* | 2/2007 | Kawaguchi | H04N 7/15 348/14.08 |
| 2007/0222746 A1 | 9/2007 | LeVine | |
| 2007/0279436 A1 | 12/2007 | Ng et al. | |
| 2008/0062126 A1 | 3/2008 | Algreatly | |
| 2008/0231926 A1 | 9/2008 | Klug et al. | |
| 2009/0000627 A1* | 1/2009 | Quaid | A61N 1/372 128/898 |
| 2009/0077504 A1 | 3/2009 | Bell et al. | |
| 2009/0103780 A1 | 4/2009 | Nishihara et al. | |
| 2009/0231425 A1 | 9/2009 | Zalewski | |
| 2009/0315839 A1 | 12/2009 | Wilson et al. | |
| 2009/0319892 A1 | 12/2009 | Wright et al. | |
| 2009/0322671 A1 | 12/2009 | Scott et al. | |
| 2010/0002909 A1 | 1/2010 | Lefevre et al. | |
| 2010/0149182 A1 | 6/2010 | Butler et al. | |
| 2010/0169795 A1 | 7/2010 | Hyndman et al. | |
| 2010/0169797 A1 | 7/2010 | Lynk et al. | |
| 2010/0302145 A1* | 12/2010 | Langridge | G06F 3/011 345/157 |
| 2010/0315413 A1* | 12/2010 | Izadi | G06F 3/017 345/419 |

OTHER PUBLICATIONS

Bimber, et al., "The Virtual Showcase", <<http://ieeexplore.ieee.org/stamp/stamp.jsp?arnumber=00963460>>, IEEE Computer Graphics and Applications, 2001, pp. 48-55.
Buchmann, et al., "FingARtips—Gesture Based Direct Manipulation in Augmented Reality", <<http://portal.acm.org/citation.cfm?doid=988834.988871 >>, Proceedings of Intl Conference on Computer Graphics and Interactive Techniques in Australasia and South East Asia (GRAPHITE), Singapore, Jun. 2004, pp. 1-10.
Cutler, et al., Two-Handed Direct Manipulation on the Responsive Workbench, <<http://portal.acm.org/citation.cfm?id=253284.253315>>, ACM Proceedings of Symposium on Interactive 3D Graphics (I3D), Providence, Rhode Island, 1997, pp. 1-8.
Du, et al., "3D Hand Model Fitting for Virtual Keyboard System", <<http://infoscience.epfl.ch/ record/125282/files/paperv1 .2.pdf>>, IEEE Workshop on Applications of Computer Vision (WACV), 2007, pp. 1-6.
El-Sawah, et al., "A Framework for 3D Hand Tracking and Gesture Recognition using Elements of Genetic Programming", <<http://ieeexplore.ieee.org/stamp/stamp.jsp?arnumber=04228577>>,IEEE Canadian Conference on Computer and Robot Vision (CRV), 2007, pp. 1-8.
El-Sawah, et al., "A Prototype for 3-D Hand Tracking and Posture Estimation", IEEE Transactions on Instrumentation and Measurement, vol. 57, No. 8, Aug. 2008, pp. 1627-1636.
ElKoura, et al., "Handrix: Animating the Human Hand", <<http://citeseerx.ist.psu.edu/viewdoc/download?doi=10.1.1.4.1074&rep=rep1&type=pdf>>, The Eurographics Association, SIGGRAPH Symposium on Computer Animation, 2003, pp. 1-11.
Frohlich, et al., "Physically-Based Manipulation on the Responsive Workbench", <<http://citeseerx.ist.psu.edu/viewdoc/download?doi=10.1.1.28.4050&rep=rep1&type=pdf>>, Proceedings of IEEE Conference on Virtual Reality (VR), 2000, pp. 1-7.
"HandVu: Vision-based Hand Gesture Recognition and User Interface", <<http://www. movesinstitute.org/-kolsch/HandVu/HandVu.html, 2011, pp. 1-4.
Hilliges, et al., "Interactions in the Air: Adding Further Depth to Interactive Tabletops", <<http://research.microsoft.com/apps/pubs/default.aspx?id=132463>>, ACM Symposium on User Interface Software and Technology (UIST), Victoria, Canada, Oct. 2009, pp. 1-10.
Kolaric, et al., "Direct 3D Manipulation Using Vision-Based Recognition of Uninstrumented Hands", <<http://www.tecgraf.puc-rio.br/-abraposo/pubs/SVR2008/SVR2008_proceedings_Sinisa.pdf>>, Proceedings of X Symposium of Virtual and Augmented Reality (SVR), Joao Pessoa, Brazil, May 2008, pp. 212-220.
Kolsouzoglou, "Mixed Reality", <<http://www.architecturemixedreality.com/Mixed_Reality/Mixed_Reality.htm>>, 2010, pp. 1-4.
Martens, et al., "Experiencing 3D Interactions in Virtual Reality and Augmented Reality", <<http://homepages.cwi.ni/-robertl/papers/2004/eusai/paper.pdf>>, ACM Proceedings of European Union Symposium on Ambient Intelligence (EUSAI), Eindhoven, Netherlands, 2004, pp. 25-28.
McDonald, et al., "Hand-Based Interaction in Augmented Reality", <<http://www.cs.toronto.edu/-smalik/downloads/mcdonald_2002_HAVE_ar_hand_interaction.pdf>>, IEEE Proceedings of Intl Workshop on HapticAudio Visual Environments and their Applications (HAVE), Ottawa, Canada, 2002, pp. 55-59.
Nacenta, et al., "Separability of Spatial Manipulations in Multi-touch Interfaces", <<http://research. microsoft. com/en-us/um/people/benko/publications/2009/Sepa rability-g i-2009-14c-m ig uel. pdf> >, ACM Proceedings of Graphics Interface (GI), Kelowna, Canada, May 2009, pp. 1-8.
Nguyen, et al., "Annotation of Human Gesture using 3D Skeleton Controls", <<http://www.lrec-conf.org/proceedings/lrec201 O/pdf/952_Paper.pdf>>, Proceedings of Intl Conference on Language Resources and Evaluation (LREC), Paris, 2010, pp. 3037-3041.
Poston, et al., "Dextrous Virtual Work", Communications of the ACM, vol. 39, No. 5, May 1996, pp. 37-45.
Smith, et al., "Glove-Box or Desktop Virtual-Reality System", <<http://www.techbriefs.com/ component/content/article/3530>>, Ames Research Center in NASA Tech Briefs, Feb. 2009, pp. 1-3.
Takaki, et al., "3D Direct Manipulation Interface by Human Body Posture and Gaze", <<https://qir.kyushu-u.ac.jp/dspace/bitstream/2324/5952/1/TakakiHCII05.pdf>>, ACM Proceedings of Intl Conference on Human-Computer Interaction, Jul. 2005, pp. 1-7.
Twombly, et al., "The Virtual Glovebox (VGX): a Semi-immersive Virtual Environment for Training Astronauts in Life Science Experi-

(56) References Cited

OTHER PUBLICATIONS ments", <<http://www.iiisci.org/journal/CV$/sci/pdfs/P670825.pdf>>, Systemics, Cybernetics and Informatics, vol. 2, No. 3, 2005, pp. 30-34.

Wilson, et al., "Bringing Physics to the Surface", <<http://research.microsoft.com/apps/pubs/default.aspx?id=132462>>, ACM Symposium on User Interface Software and Technology (UIST), Monterey, California, Oct. 2008, pp. 67-76.

Zhao, et al., "Inverse Kinematics Positioning Using Nonlinear Programming for Highly Articulated Figures", <<http://reference.kfupm.edu.sa/content/i/n/inverse_kinematics_positioning_using_non_122800.pdf, ACM Transactions on Graphics, vol. 13, No. 4, Oct. 1994, pp. 1-30.

"Final Office Action Issued in U.S. Appl. No. 12/940,322", dated Dec. 3, 2014, 35 Pages.

"Final Office Action Issued in U.S. Appl. No. 12/940,322", dated Oct. 2, 2015, 35 Pages.

"Non-Final Office Action Issued in U.S. Appl. No. 12/940,322", dated May 2, 2016, 39 Pages.

"Non-Final Office Action Issued in U.S. Appl. No. 12/940,322", dated Apr. 27, 2015, 39 Pages.

"Non-Final Office Action Issued in U.S. Appl. No. 12/940,322", dated Sep. 6, 2013, 27 Pages.

"Non-Final Office Action Issued in U.S. Appl. No. 12/940,322", dated Jul. 7, 2014, 36 Pages.

"Notice of Allowance Issued in U.S. Appl. No. 12/940,322", dated Aug. 12, 2016, 5 Pages.

\* cited by examiner

AUGMENTED REALITY WITH DIRECT USER INTERACTION

RELATED APPLICATIONS

This application is a continuation of and claims priority to U.S. application Ser. No. 12/940,322, filed on Nov. 5, 2010, and entitled "AUGMENTED REALITY WITH DIRECT USER INTERACTION." This application claims the benefit of the above-identified application, and the disclosure of the above-identified application is hereby incorporated by reference in its entirety as if set forth herein in full.

BACKGROUND

In an augmented reality system, a user's view of the real world is enhanced with virtual computer-generated graphics. These graphics are spatially registered so that they appear aligned with the real world from the perspective of the viewing user. For example, the spatial registration can make a virtual character appear to be standing on a real table.

Augmented reality systems have previously been implemented using head-mounted displays that are worn by the users. However, these suffer from many ergonomic drawbacks, such as a narrow field-of-view, low resolution, ghosting, and issues with eye-accommodation as a result of wrong focal distances. Other augmented reality display techniques exploit large spatially aligned optical elements, such as transparent screens, holograms, or video-projectors to combine the virtual graphics with the real world. These allow for higher resolution and larger display area configurations, improved eye accommodation, and easier calibration. However, these display techniques require the user's head to be properly aligned with the display in order for the graphics to be correctly spatially registered.

For each of the above augmented reality display techniques, there is a problem of how the user interacts with the augmented reality environment that is displayed. Where interaction is enabled, it has previously been implemented using indirect interaction devices, such as a mouse or stylus that can monitor the hand movements of the user in six degrees of freedom to control an on-screen object. However, when using such interaction devices the user feels detached from the augmented reality environment, rather than feeling that they are part of (or within) the augmented reality environment.

The embodiments described below are not limited to implementations which solve any or all of the disadvantages of known augmented reality systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Augmented reality with direct user interaction is described. In one example, an augmented reality system comprises a user-interaction region, a camera that captures images of an object in the user-interaction region, and a partially transparent display device which combines a virtual environment with a view of the user-interaction region, so that both are visible at the same time to a user. A processor receives the images, tracks the object's movement, calculates a corresponding movement within the virtual environment, and updates the virtual environment based on the corresponding movement. In another example, a method of direct interaction in an augmented reality system comprises generating a virtual representation of the object having the corresponding movement, and updating the virtual environment so that the virtual representation interacts with virtual objects in the virtual environment. From the user's perspective, the object directly interacts with the virtual objects.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop augmented reality system, the system described is provided as an example and not a limitation. As those skilled in the art will appreciate, the present examples are suitable for application in a variety of different types of augmented reality systems.

Described herein is an augmented reality system and method that enables a user to interact with the virtual computer-generated graphics using direct interaction. The term "direct interaction" is used herein to mean an environment in which the user's touch or gestures directly manipulates a user interface (i.e. the graphics in the augmented reality). In the context of a regular 2-dimensional computing user interface, a direct interaction technique can be achieved through the use of a touch-sensitive display screen. This is distinguished from an "indirect interaction" environment where the user manipulates a device that is remote from the user interface, such as a computer mouse device.

Note that in the context of the augmented reality system, the term "direct interaction" also covers the scenario in which a user manipulates an object (such as a tool, pen, or any other object) within (i.e. not remote from) the augmented reality environment to interact with the graphics in the environment. This is analogous to using a stylus to operate a touch-screen in a 2-d environment, which is still considered to be direct interaction.

Figure 1:
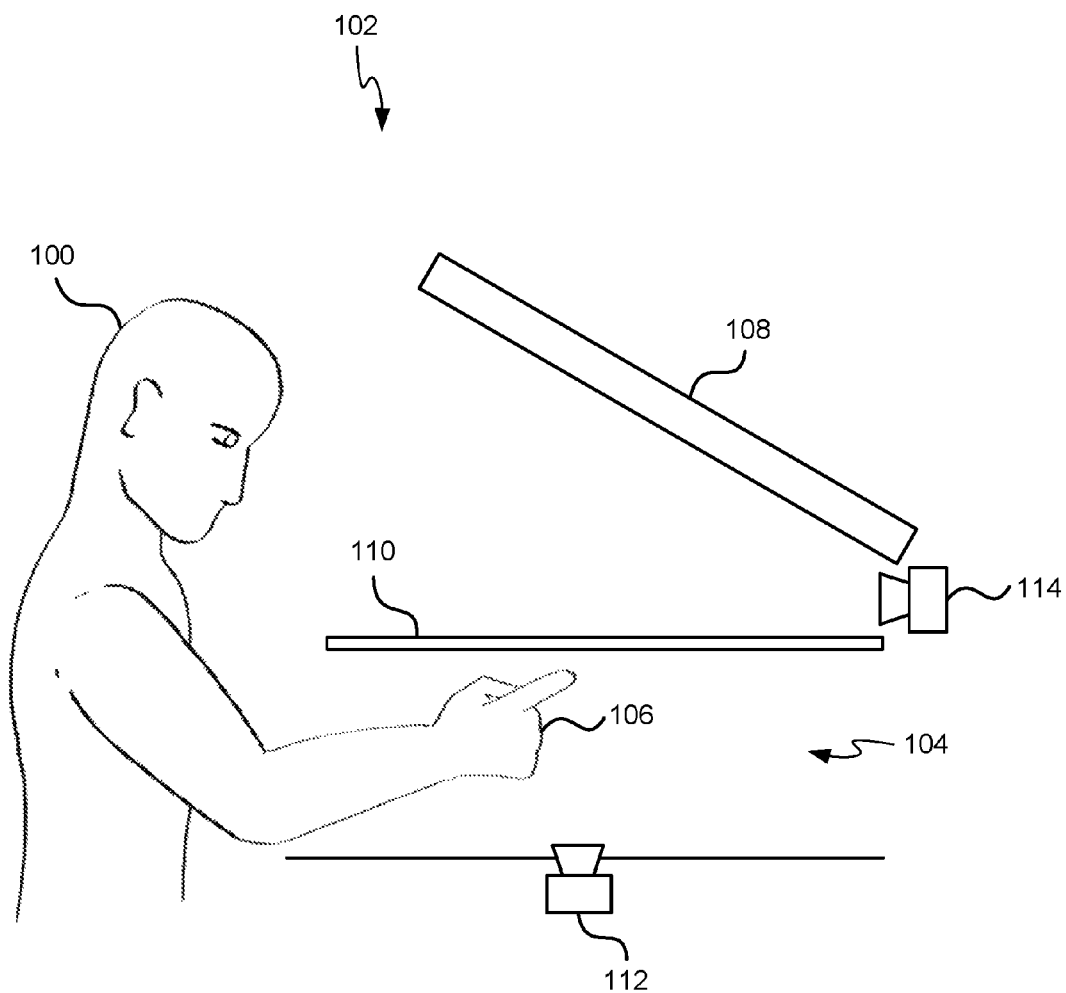
FIG. 1 illustrates an augmented reality system.

An augmented reality system is a 3-dimensional system, and therefore the direct interaction also operates in 3-d. Reference is first made to FIG. 1, which illustrates an augmented reality system that enables 3-d direct interaction.

FIG. 1 shows a user 100 interacting with an augmented reality system 102. The augmented reality system 102 comprises a user-interaction region 104, into which the user 100 has placed a hand 106 (or other body part). The user-interaction region 104 defines an interaction space in which the user is able to interact with the augmented reality environment in 3-d. The user-interaction region 104 is large enough for the user to maneuver at least one hand to interact with the augmented reality environment. However, the user interaction region 104 can also be larger, and hence enable the user to perform larger-scale manipulations, and may accommodate more than one hand, or hands of more than one user.

The augmented reality system 102 also comprises a display device which is at least partially transparent and allows the user to concurrently view real objects through the display device, and also computer-generated graphics displayed on the display device. In the example of FIG. 1, the display device comprises a display screen 108 and an optical beam splitter 110. The display screen 108 is arranged to display a virtual environment or scene comprising the computer-generated graphics that augment and enhance reality. The display screen 108 can be, for example, a flat panel display such as a liquid crystal display (LCD) or organic light emitting diode (OLED) display, or any other suitable type of display. In other examples, the display screen 108 can be a stereoscopic or volumetric display, as described in more detail below.

The optical beam-splitter 110 reflects a portion of incident light, and also transmits (i.e. passes through) a portion of incident light. This enables the user 100, when viewing the surface of the optical beam-splitter 110, to see through the optical beam-splitter 110 and also see a reflection on the optical beam-splitter 110 at the same time (i.e. concurrently). In one example, the optical beam-splitter 110 can be in the form of a half-silvered mirror. Note that whilst the term half-silvered mirror implies 50% of the light is transmitted and 50% is reflected, it will be understood that any suitable ratio of transmission to reflection can be used.

The optical beam-splitter 110 is positioned in the augmented reality system 102 so that, when viewed by the user 100, it reflects light from the display screen 108 and transmits light from the user-interaction region 104. Therefore, the user 100 looking at the surface of the optical beam-splitter can see the reflection of the virtual environment displayed on the display screen 108, and also the contents of the user-interaction region 104 at the same time.

In the example arrangement shown in FIG. 1, the optical beam-splitter 110 is positioned substantially horizontally, with the display screen 108 angled relative to the optical beam-splitter 110 to enable the reflection to be seen by the user 100. In other examples, other arrangements can be used, such as having the display screen 108 substantially horizontal and the optical beam-splitter 110 angled. Further arrangements are also illustrated and discussed below with reference to FIGS. 5 and 6.

The relative arrangement of the user-interaction region 104, optical beam-splitter 110, and display screen 108 enables the user 100 to simultaneously view both a reflection of a computer generated image (the virtual environment) from the display screen 108 and an object located in the user-interaction region 104, such as the user's hand 106 as in FIG. 1. Therefore, by controlling the graphics displayed in the reflected virtual environment, the user's view of the object in the user-interaction region 104 can be augmented, thereby creating an augmented reality environment. View-controlling materials, such as privacy film, can be used on the display screen 108 to prevent the user from seeing the original image directly on-screen.

Note that in other examples, different types of display device can be used. For example, a transparent OLED panel can be used, which can display the virtual environment, but is also transparent. Such an OLED panel enables the augmented reality system to be implemented without the use of an optical beam splitter.

In order to enable direct interaction between the graphics in the virtual environment and the object in the user-interaction region 104, the object is tracked using an image sensor 112, such as a camera. The image sensor 112 captures a plurality of images of the contents of the user-interaction region, and enables the position, movement and, optionally, size/shape of the object to be accurately determined and monitored.

In one example, the image sensor 112 is a depth camera (also known as a z-camera), which generates both intensity/color values and a depth value (i.e. distance from the camera) for each pixel in the images captured by the camera. The depth camera can be in the form of a time-of-flight camera, stereo camera or a regular camera combined with a structured light emitter. The use of a depth camera enables three-dimensional information about the position, movement, size and shape of the object to be determined. In some examples, a plurality of depth cameras can be located at different positions within the user-interaction region 104, in order to avoid occlusion when multiple objects are present in the user-interaction region 104, and enable accurate tracking to be maintained.

In other examples, a regular 2-d camera can be used to track the 2-d position, posture and movement of the object, and the object's shape. Alternatively, a plurality of regular cameras can be used, e.g. at different positions, to derive 3-d information on the object's movement, position and size.

In order to further improve the spatial registration of the virtual environment with the object (e.g. user's hand 106), a tracking sensor 114, such as a further camera, can be used to track the face, head or eye position of the user 100. Using head or face tracking enables perspective correction to be performed, so that the graphics are accurately aligned with the real object. Optionally, the tracking sensor 114 can track the gaze of the user's eyes, to more accurately determine where the user is looking on the optical beam-splitter 110. The camera 114 shown in FIG. 1 is positioned between the display screen 108 and the optical beam-splitter 110. However, in other examples, the camera 114 can be positioned anywhere where the user's face can be viewed, including within the user-interaction region 104 so that the camera 114 views the user through the optical beam-splitter 110.

Not shown in FIG. 1 is a computing device that performs the processing to generate the augmented reality environment in the system of FIG. 1. This is shown schematically in FIG. 2, which illustrates a computing device 200 receiving input from the image sensor 112 in the user-interaction region (e.g. depth camera) and the tracking sensor 114 used for face tracking. The computing device 200 processes the input from these two cameras, and controls the display screen 108 based on these inputs. The process for performing this is described below with reference to FIG. 4. The computing device 200 comprises at least one processor and associated software, and is described in more detail with reference to FIG. 7 below.

Figure 2:
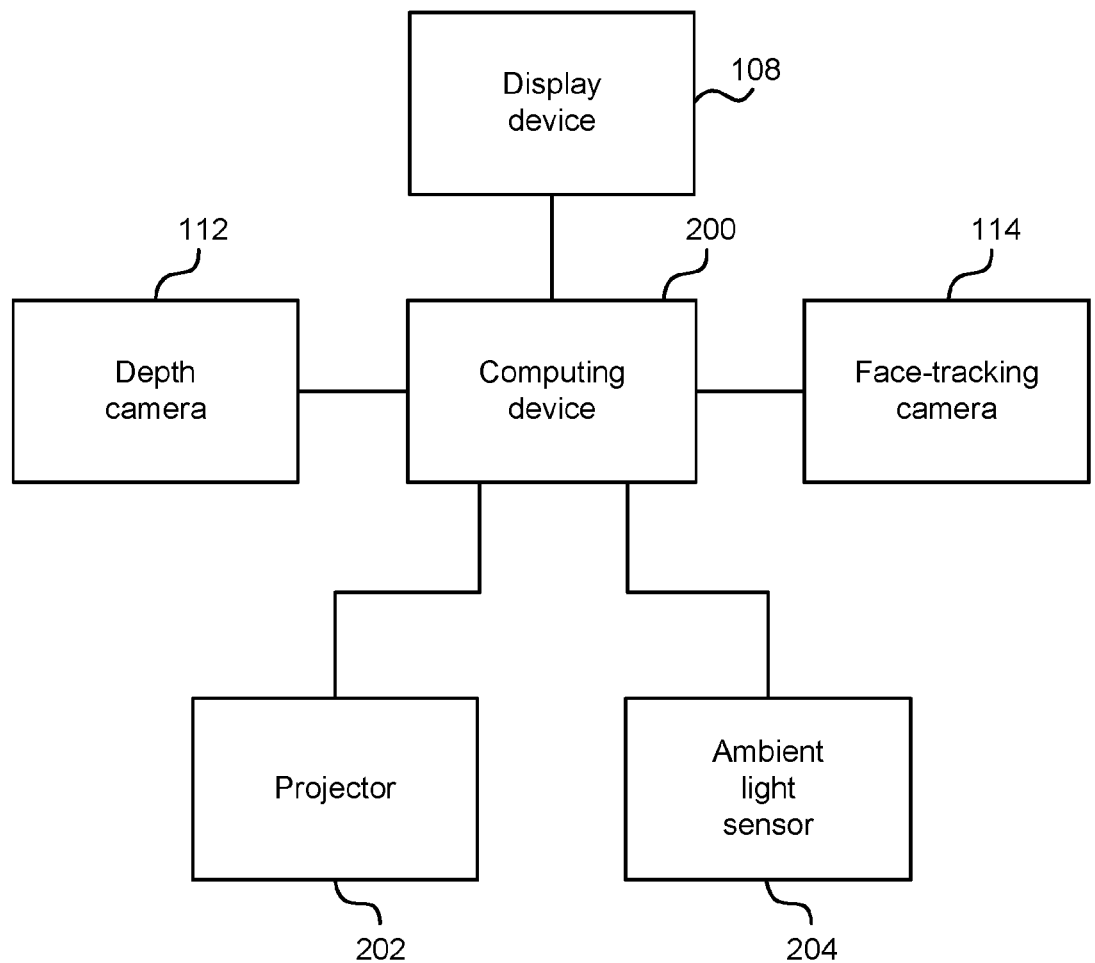
FIG. 2 illustrates a schematic diagram of hardware elements in the augmented reality system.

Optionally connected to the computing device 200 in FIG. 2 is a projector 202 that can selectively project images or illumination into the user-interaction region 104 under the control of the computing device 200, and an ambient light sensor 204 that measures ambient light levels and provides these to the computing device 200. The use of these optional devices is discussed in more detail below.

Figure 3:
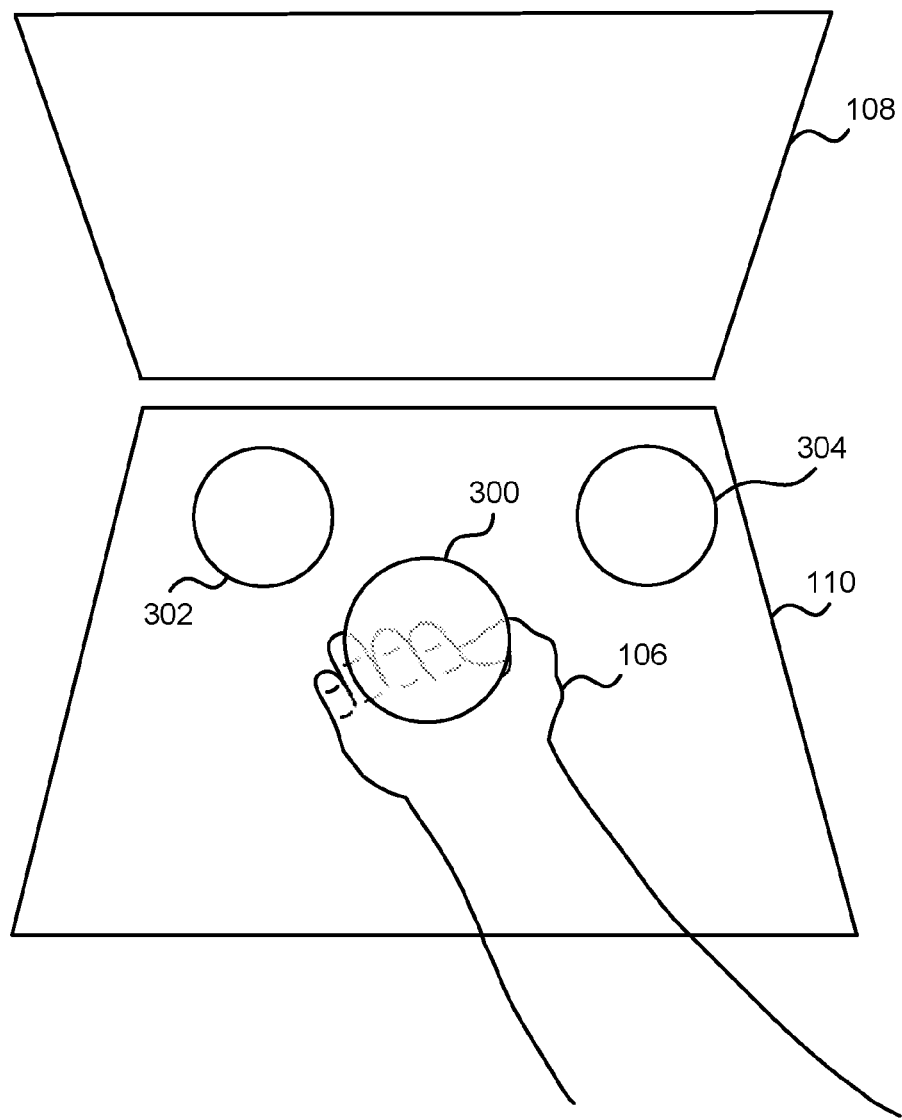
FIG. 3 illustrates an example of direct user interaction in the augmented reality system.

The above-described augmented reality system can be used to provide direct interaction between the user 100 and the graphics rendered in the virtual environment. Before describing the process for achieving this, FIG. 3 illustrates an example of how a direct interaction augmented reality environment is viewed from the user's perspective. FIG. 3 shows the hand 106 of the user, which is in the user-interaction region, beneath the optical beam-splitter 110. The display screen 108 is being controlled to display a virtual environment comprising three virtual objects (spheres 300, 302 and 304). The virtual environment with the three spheres is reflected in the optical beam-splitter, so that from the user's perspective they appear co-located with the user's hand.

The direct interaction techniques allow the user to use his or her hand 106 to directly interact with the virtual objects. For example, as shown in FIG. 3, the user can move his or her hand 106 underneath sphere 300 to scoop it up in the palm of their hand, and move the sphere from one location to another. The augmented reality system is arranged so that it appears to the user that the virtual object (e.g. sphere 300) is responding directly to the user's own hand 106. Many other types of interaction with the virtual objects (in addition to scooping and moving) are also possible. For example, the augmented reality system can implement a physics simulation-based interaction environment, which models forces (such as impulses, gravity and friction) imparted/acting on and between the real and virtual objects. This enables the user to push, pull, lift, grasp and drop the virtual objects, and generally manipulate the virtual objects as if they were real. Alternatively, the augmented reality system can render graphics on or around the user's hand, such that the graphics move in tandem with movement of the hand.

Figure 4:
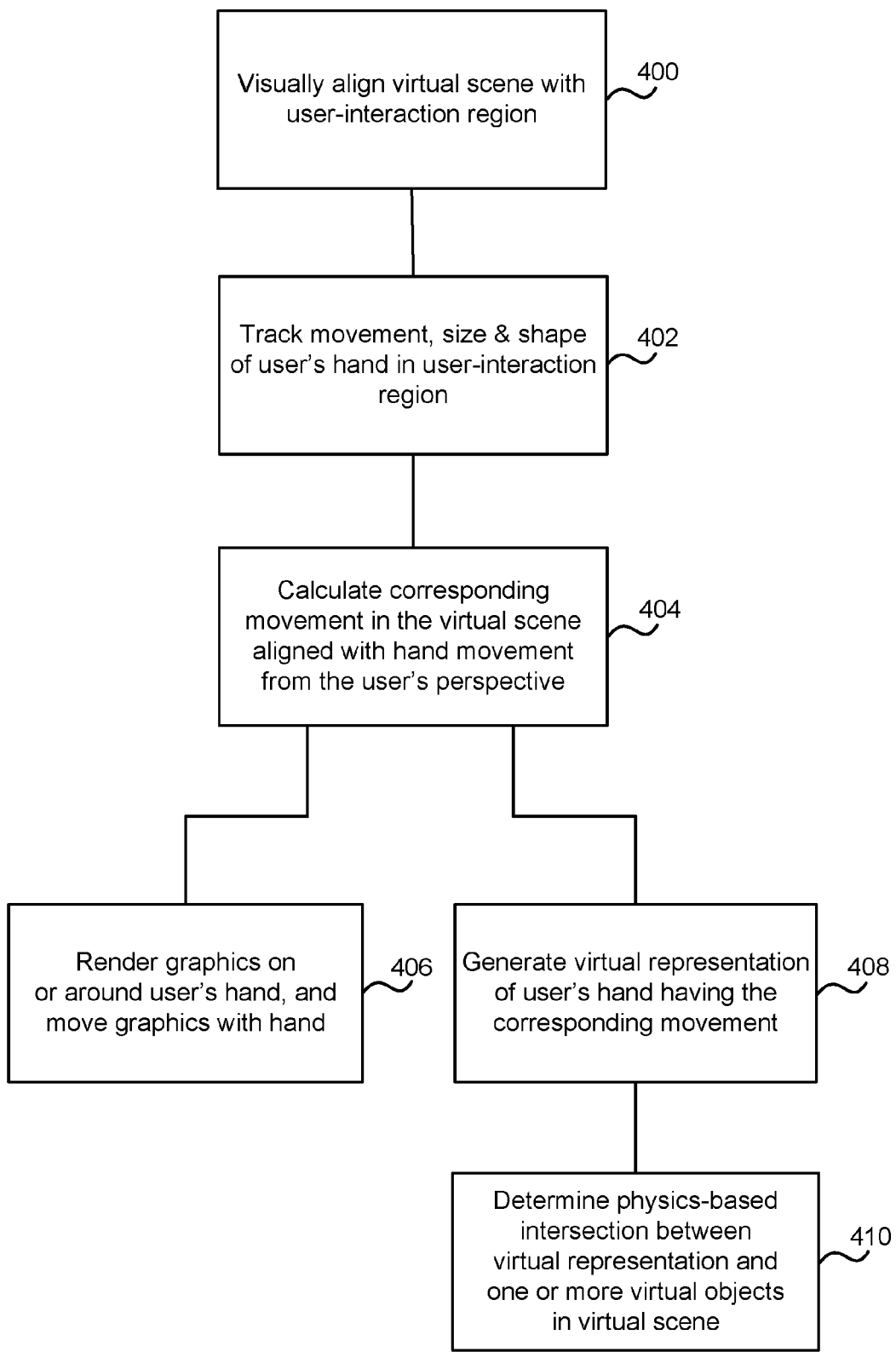
FIG. 4 illustrates a flowchart of a process for direct interaction in the augmented reality system.

Reference is now made to FIG. 4, which illustrates a flowchart of a process for direct interaction in the augmented reality system. The process of FIG. 4 can be performed by the processor in the computing device 200 described with reference to FIG. 2.

Firstly, the computing device 200 receives the images of the user's head from the tracking sensor 114, and uses these images to visually align 400 the virtual environment with the user-interaction region 104. This is performed by determining the user's perspective from the user's head image. In other words, the computing device 200 determines the viewing position of the user's head (or face or eyes) relative to the optical beam-splitter 110, and hence can determine the angles (both vertical and horizontal) from which the user is viewing the user-interaction region 104. These angles can be used to adapt the graphics of the virtual environment to align them with the user-interaction region 104 and any objects located therein.

For example, consider a scenario in which the augmented reality system is supposed to be displaying a virtual environment having a virtual sphere on top of a real object located in the center of the user-interaction region. If the user is of a certain height, and has their head position aligned with the center of the optical beam-splitter, then the computing device 200 can determine from the face tracking camera images that visual alignment between the virtual sphere and the real object can be achieved by displaying the virtual environment in the centre of the display screen 108. However, if, for example, the user is taller and viewing the optical beam splitter from left-of-center, then the virtual sphere is not aligned with the object if the virtual environment is displayed in the center of the display screen 108. To counteract this, the computing device 200 uses the face tracking images to calculate the viewing angles of the user, and shifts the display of the virtual environment to the left and towards the user in dependence on these angles. This brings the virtual environment into line with the user's viewing position, and spatial registration is achieved.

The alignment of the virtual environment with the user-interaction region 104 is performed in real-time, so that the visual alignment remains despite the user 100 moving their head whilst operating the augmented reality system.

The images from the image sensor 112 in the user-interaction region 104 are then used to track 402 the position and movement (and optionally size and shape) of one or more user-controlled objects located in the user-interaction region 104. These objects can the user's hand 106 and/or any other object controlled by the user (such as a tool, stylus, tablet or sheet). If a depth camera is used, then the movement and position in 3-d can be determined, as well as an accurate size of the object.

Once the position and movement of the object in the user-interaction region 104 has been determined by the computing device 200, an equivalent, corresponding position and movement is calculated 404 in the virtual environment. In other words, the computing device 200 determines where in the virtual environment the real object is located given that, from the user's perspective, the virtual environment occupies the same space as the user-interaction region 104. This corresponding position and movement in the virtual environment can be used to control direct interaction between the object and the virtual environment.

Once the corresponding movement and position of the object has been calculated for the virtual environment, the computing device 200 can use this information to update the virtual environment to display spatially aligned graphics. There are several different options for how the computing device 200 can use spatially aligned graphics.

In a first example, the computing device 200 can use the corresponding position and movement to render 406 graphics that are located on or around the real object, and that move (and optionally rotate, scale and translate) with the movement of the real object. For example, if the user is holding a blank sheet of paper in the user-interaction region 104, the computing device 200 can render an image such that it appears aligned on the real sheet of paper. As the user 100 moves the sheet of paper, the image also moves in a corresponding fashion. In another example, control buttons can be rendered to appear on top of a real object. These control buttons then move with the movement of the real object, and may be activated by tracking the position of another object (such as a hand or finger) coming into contact with the corresponding location of the control button.

In a second example, the computing device 200 can use the information regarding the size and shape of the object to generate 408 a virtual representation of the object in the virtual environment. For example, the computing device 200 can generate a virtual representation having substantially the same size and shape as the real object (to the extent visible from the image sensor 112) and insert this virtual representation into the virtual environment at the corresponding location to the real object. The virtual representation can be moved in the virtual environment with the corresponding movement to the real object. In other words, as the user 100 moves the real object (e.g. hand 106) the virtual representation of the object moves in the virtual environment in an equivalent way.

Interaction between the virtual representation and the virtual objects in the virtual environment can then be determined 410. This can use a physics simulation-based environment to determine the interactions that occur. For example, the physics simulation-based environment can simulate the effects of gravity, friction and other forces on and between the virtual representation and the virtual objects. This enables the user 100 to control the virtual representation (by manipulating the real object) to push, grasp, lift, scoop or drop virtual objects in three dimensions, and they behave in a similar way to how a real object would behave. The physics simulation-based environment enables 3-d operations on the virtual objects such as stacking or placing virtual objects inside another in a manner that is difficult to achieve with regular 2-d direct interaction environments.

The virtual representation can be rendered in the virtual environment, so that it is visible to the user on the optical beam-splitter. Alternatively, the virtual representation can be generated and used in the virtual environment, but not rendered as visible. In this case, the effects of the virtual representation are seen in terms of interaction with other virtual objects, but the user does not see the actual virtual representation, but only the object in the user-interaction region that it represents.

Therefore, the above-described augmented reality system enables a user 100 to directly interact with virtual objects that are visually aligned with real objects in three dimensions. This provides interaction environment that is intuitive and immersive to the user.

An enhancement can be made to the above-described augmented reality system to improve the realism of the augmented reality graphics. The user-interaction region 104 is a real 3-dimensional space, and can readily be seen as such by the user. However, the virtual environment is a 3-dimensional scene, but rendered on a 2-dimensional display screen 108. The user 100 can distinguish this by a lack of depth to the virtual environment reflected in the optical beam-splitter.

To improve the perception of depth of the virtual environment, a number of enhancements can be made to the system of FIG. 1. For example, the display screen 108 of FIG. 1 can be replaced with a 3D display device, such as a stereoscopic display, an autostereoscopic display, or a volumetric display. The augmented reality system of FIG. 1 is suited to the use of such 3D displays, as the user has their hands behind the optical beam-splitter, whereas the reflection of the display is in front of the user's hands. Therefore, the user's hands are not obscuring part of the display, which can otherwise adversely affect the 3D perception. In addition, volumetric displays often utilize moving parts which makes direct interaction with the user's hands difficult, whereas the use of the optical beam-splitter in FIG. 1 means that direct interaction with a volumetric display is possible.

Figure 5:
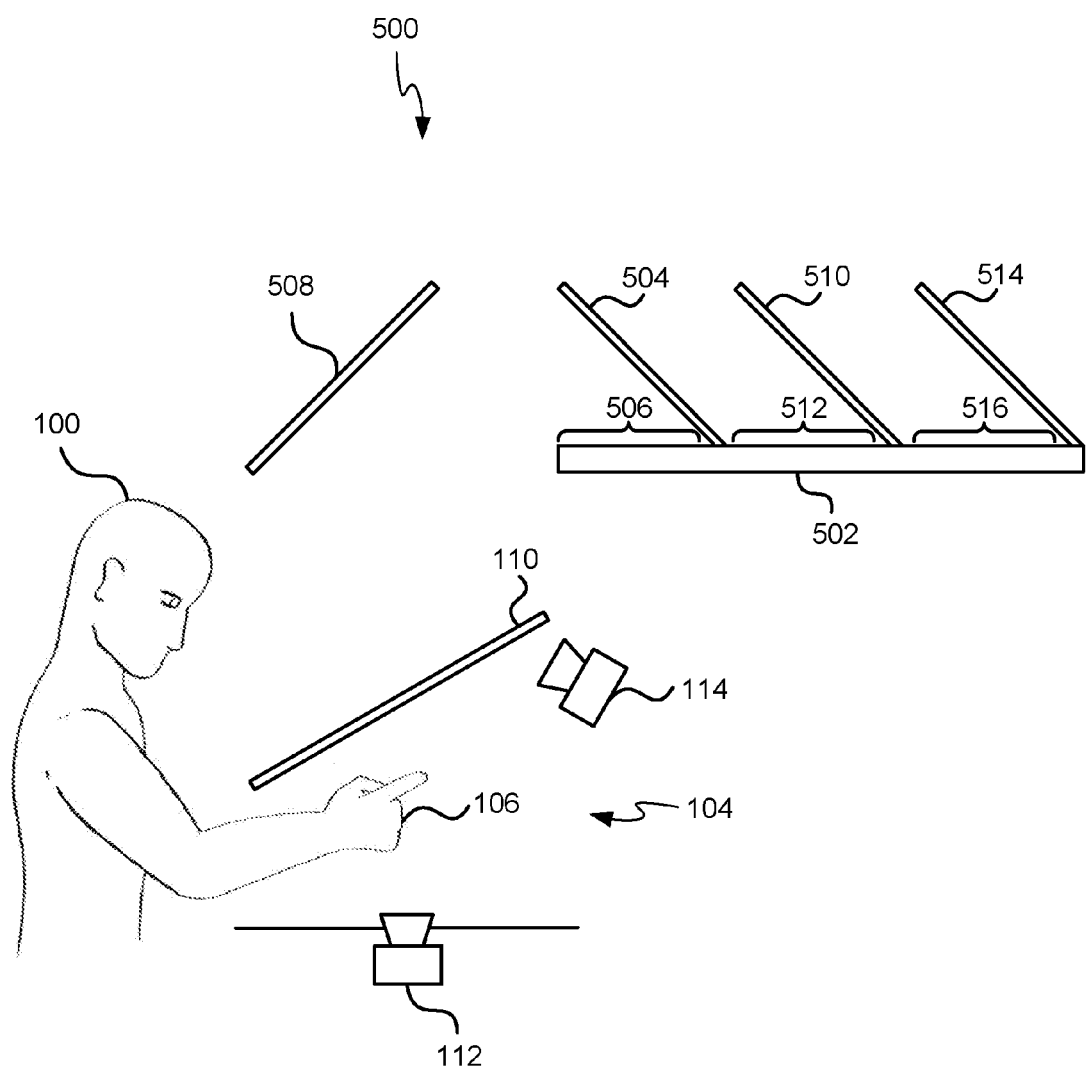
FIG. 5 illustrates an augmented reality system with a depth display.

FIG. 5 illustrates a further enhancement to improve the perception of depth in an augmented reality system. FIG. 5 shows an augmented reality system 500 that is similar in configuration to that shown in FIG. 1, except that the display can show objects at multiple depths. The augmented reality system 500 comprises the user-interaction region 104 with the image sensor 112 to track objects (such as the hand 106 of the user 100), the optical beam-splitter 110 and the face tracking sensor 114 as with FIG. 1.

However, the augmented reality system 500 comprises a display screen 502 divided into a plurality of portions. A first display beam-splitter 504 (such as a half-silvered mirror) is positioned to reflect light from a first portion 506 of the display screen 502 towards a full-silvered mirror 508 (and passes light incident on the opposite side the further optical beam-splitter 504). Optionally, additional portions of the display screen 502 can be included, each of which has an associated additional optical beam-splitter arranged to reflect light from the portion towards the full-silvered mirror 508. For example, as shown in FIG. 5 second display beam-splitter 510 reflects light from second portion 512 towards the full-silvered mirror 508 via the first display beam-splitter 504. A further full-silvered mirror 514 is positioned to reflect light from a third portion 516 of the display via the second display beam-splitter 510 and first display beam-splitter 504 towards the full-silvered mirror 508.

The full-silvered mirror 508 is arranged to reflect the light from the display screen portions onto the optical beam-splitter 110. Therefore, when viewed by the user on the optical beam-splitter, the images shown on each of the portions appear overlaid on one another. However, the images shown on each of the portions appear at different depths to the user. For example, a virtual object displayed in the first portion 506 of the display screen 502 appears closer to the surface of the optical beam-splitter 110 than the same virtual object displayed in the third portion 516 of the display screen 502 (this appears closer to the bottom of the user-interaction region 104 to the user).

Therefore, in the arrangement of FIG. 5, each portion of the display screen corresponds to a different depth layer that can be represented in the virtual environment. The computing device 200 can use this to provide the impression of virtual objects at different depths. For example, if the virtual environment comprises a virtual sphere that is rendered (to the user) as resting on the bottom of the user-interaction region 104, then the computing device 200 can control the display screen 502 to display the virtual sphere in the third portion 516. If the user 100 grasps the virtual sphere with hand 106 (as outlined above) and raises the virtual sphere, then the computing device 200 moves the virtual sphere with a corresponding motion to the hand 106. As the virtual sphere is raised, the computing device 200 can switch the display of the virtual sphere from the third portion 516 to the second portion 512, and ultimately to the first portion 506. By transitioning between depth layers in this way, the user is given the impression that the virtual object is also located at different depths, in common with the real objects.

Note that whilst three portions (i.e. depth layers) were illustrated in FIG. 5, a larger or smaller number of portions can also be used. Also note that whilst a single large display screen 502 is shown in FIG. 5, the different portions can also be implemented with separate, individual display devices.

Figure 6:
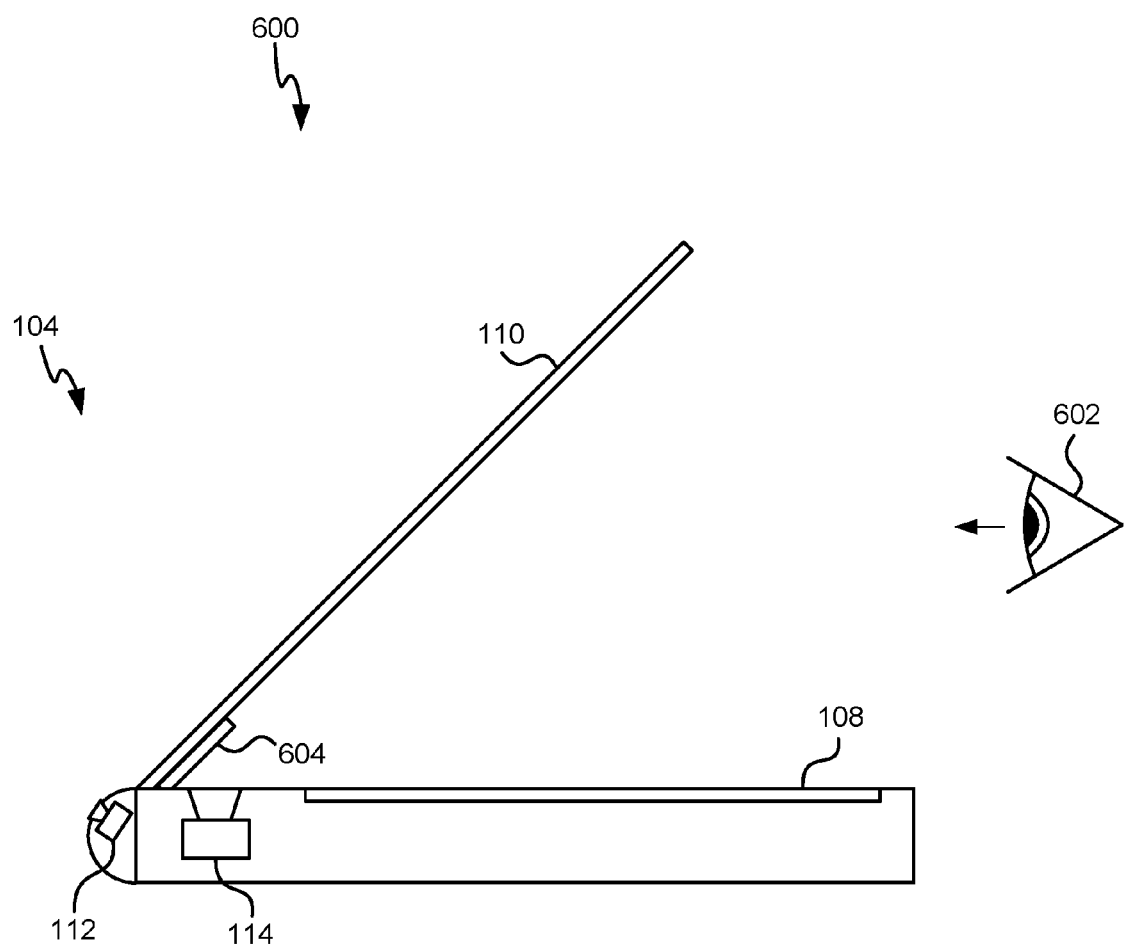
FIG. 6 illustrates a hand-held augmented reality system.

Reference is now made to FIG. 6, which illustrates a further form of augmented reality system. FIG. 6 shows a hand-held augmented reality system 600, which can be implemented in any suitable type of hand-held or portable device, such as a mobile phone, tablet or notebook computer. The hand-held augmented reality system 600 comprises display screen 108, which can be, for example, the display screen used for regular interaction with the hand-held device. In the example shown in FIG. 6, this is a display screen mounted on the front face of the device.

An optical beam-splitter 110 is mounted such that it can be positioned to reflect the display screen 108, and also enable the user to look through the optical beam-splitter 110. For example, as shown in FIG. 6, the optical beam-splitter 110 can be hinged along one edge of the display screen 108, so that it can be flipped up by a user to an angle at which the display screen 108 is reflected in the optical beam-splitter 110, but the user can see through the optical beam-splitter 110 to the other side of the device, as indicated by eye 602.

In the augmented reality system 600, the user-interaction region 104 is located outside of the device, in the region that the user can see into through the optical beam-splitter 110 when looking along the length of the device from eye 602. Image sensor 112 is positioned to track objects located in the user-interaction region 104, e.g. a user can reach around behind the device with their hand and interact with virtual objects shown on the optical beam-splitter.

In a hand-held augmented reality system 600, face tracking and perspective correction is of lower importance, as the user can readily adjust the visual alignment easily by simply orienting the device in their hands. However, face tracking and perspective correction can still be used, and a face tracking sensor 114 included for this purpose, positioned so as to view the user's face. In the example of FIG. 6, the face tracking sensor 114 is mounted on the front of the device (where cameras are frequently located in hand-held devices). In order to view the user's face, a portion 604 of the optical beam-splitter 110 is fully-silvered, so that a reflection of the user's face is visible to the face tracking sensor 114.

In other examples of a hand-held augmented reality system, a transparent or partially transparent display screen, such as a transparent OLED display, can be used in place of the optical beam splitter. In such examples, the transparent display screen can be flipped up such the user can look through the screen (in a similar manner to the beam splitter in FIG. 6) and place their hands behind the screen to interact as described above. Such a system therefore provides augmented reality without a separate display screen and optical beam splitter.

Optionally, the transparent display screen may be switchable between a first state in which it is transparent such that both the virtual environment is visible on the display and the user interaction region is visible through the display, and a second state in which it is not transparent an operates like a regular display screen (i.e. only the virtual environment is visible).

Further arrangements for the augmented reality system described above are also possible. For example, a table-top augmented reality system can be implemented in which the surface of the table-top is formed from the optical beam-splitter, and the display screen is mounted above this, positioned to reflect in the optical beam-splitter. A void below the table-top forms the user-interaction region. Several users can simultaneously use a table-top augmented reality system such as this (e.g. a user on each side of the table), each of which is provided with their own display screen (or a portion of a larger display screen) to render perspective corrected graphics for that user. However, the augmented realities for each of the users using the table-top system can be linked so that they interact with each other. For example, the augmented reality system can be arranged to enable a user to pass a virtual object to another user.

Similar collaboration scenarios can be implemented by connecting two or more of the augmented reality systems described above. For example, two of the augmented reality systems of FIG. 1 can be connected, and each operated by a different user (who may be geographically separated). The two users can then interact with the same virtual environment, such that they both view the same virtual objects, and manipulations to virtual objects by one user are seen by the other user.

Any of the above-described augmented reality systems can be further enhanced by controlling the lighting of the display device and/or the user-interaction region 104. The relative visibility of an object in the user-interaction region compared to the reflection of the virtual environment depends upon their relative lighting levels. For example, if an object in the user-interaction region is dimly lit, then the reflection of the virtual environment appears more visible. Conversely, a dark virtual environment makes objects in the user-interaction region more visible to the user.

The relative lighting can be controlled to enhance the operation of the augmented reality system. For example, to control the lighting within the user-interaction region 104, a projector 202 (as shown in FIG. 2) can be positioned to project light into the user-interaction region 104 responsive to commands from the computing device 200. The projector can be used to selective illuminate some regions of the user-interaction region, or, conversely, selectively omit lighting in certain regions. For example, the user's hands can be illuminated to make them more visible (as their position, size and shape are known by the computing device), whilst not illuminating other parts of the user-interaction region 104 to make them less visible.

The projector 202 can also be utilized to enhance the realism of the interaction with virtual objects. For example, when a user is holding a virtual object (such as that shown in FIG. 3), the projector can be controlled to illuminate some of the hand 106 of the user, but not a portion corresponding to the shape of the virtual object. To the user, this appears as though the virtual object in their hand is casting a shadow on their hand. This further enhances the impression that the virtual object is located on the hand of the user.

The relative lighting can also be controlled by controlling the light emitted by the display device. For example, the display screen 108 can be controlled so that black pixels are rendered at the locations in the virtual environment that are coincident with the user's hands (provided other virtual objects are not present at these locations). The rendering of black pixels reduces the reflection on the optical-beam splitter, and makes the user's hands more visible in the user-interaction region 104.

In another example, the backlighting of the display screen 108 can be controlled. Some display screens, such as those based on OLED technology, enable the light emitted by the display screen to be controlled on a pixel-by-pixel level. This enables the computing device 200 to accurately make some portions of the virtual environment brighter (and hence more visible), and reduce the light emitted from some portions (increasing visibility of the corresponding portion of the user-interaction region relative to surrounding portions). Other display screens, such as LCD, use an overall backlight, but these can be partitioned into portions (e.g. a grid), such that certain regions of the display screen can be controlled by the computing device to be brighter than others.

In order to maintain a consistent user experience, an ambient light sensor 204 (as shown in FIG. 2) can be connected to the computing device 200 to measure the ambient light level and provide the ambient light level measurement to the computing device 200. The computing device 200 can then control the output light intensity of the display screen 108 responsive to this ambient light level measurement (for example an increased ambient light level can prompt an increased display screen intensity). The projector 202 can be similarly controlled in response to the ambient light level.

Note that in any of the augmented reality systems described above the precise alignments of the optical elements (e.g. optical beam-splitters, display screens and mirrors) can be varied. Also note that the optical beam-splitters and mirrors do not need to be flat, but can be curved or lensed as appropriate to achieve the desired optical effects.

Furthermore, the positioning of the cameras used for object tracking and face tracking can also be varied. For example, the cameras can be positioned in any location that enables a view of the user's face and/or the user-interaction region to be achieved. This can be via one or more mirrors or other optical elements.

In examples, a single camera can be used for both face tracking and object tracking. In one example, a single camera can be positioned within the user-interaction region 104, and this camera is arranged to view both the user-controlled objects in the user-interaction region 104, and can also observe the face of the user reflected in the optical beam-splitter at the same time. This single camera can then be used to perform both face tracking and object tracking. In an alternative example, a single camera can be arranged to capture an image that is divided into sections, with one section showing the user's face, and another showing the objects in the user-interaction region 104. This can be performed by positioning a camera with a mirror directing a portion of the camera's field of view to a different part of the augmented reality system. For example, an upper half of the camera's field of view can view the user's face directly, and a lower half of the camera's field of view is of a mirror arranged to reflect the objects in the user-interaction region.

Figure 7:
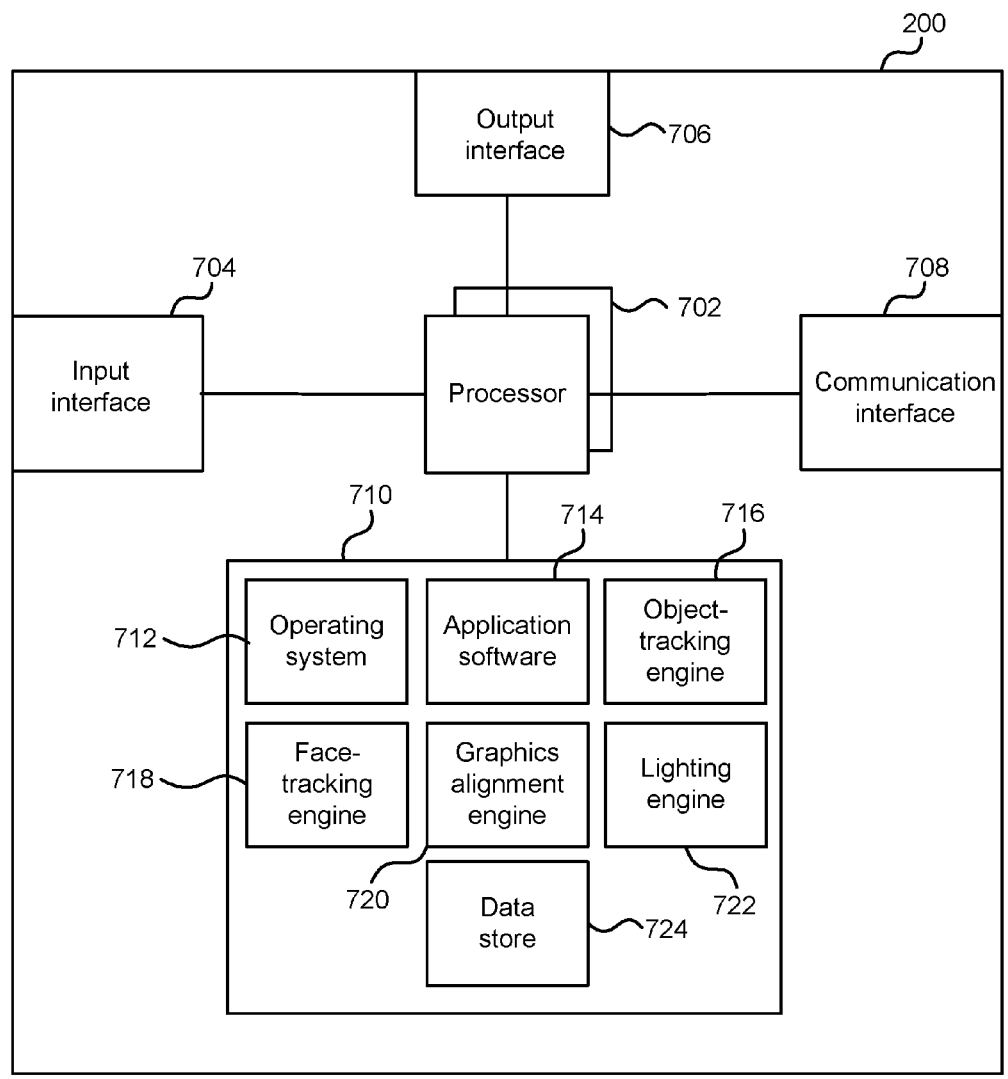
FIG. 7 illustrates an exemplary computing-based device in which embodiments of augmented reality with direct interaction can be implemented.

Reference is now made to FIG. 7, which illustrates various components of computing device 200. Computing device 200 may be implemented as any form of a computing and/or electronic device in which the processing for the augmented reality direct interaction may be implemented.

Computing device 200 comprises one or more processors 702 which may be microprocessors, controllers or any other suitable type of processor for processing computing executable instructions to control the operation of the device in order to implement the augmented reality direct interaction techniques.

The computing device 200 also comprises an input interface 704 arranged to receive and process input from one or more devices, such as the object tracking image sensor 112, face tracking sensor 114 and ambient light sensor 204. The computing device 200 further comprises an output interface 706 arranged to output the virtual environment to display screen 108 (or a plurality of display screens). The output interface 706 can also control the operation of projector 202.

The computing-based device 116 also comprises a communication interface 708, which can be arranged to communicate with one or more communication networks. For example, the communication interface 708 can connect the computing device 200 to a network (e.g. the internet). The computing device 200 can communicate with other augmented reality systems using the communication interface 708. The communication interface 708 can also enable the computing device 200 to communicate with other network elements to store and retrieve data.

Computer-executable instructions and data storage can be provided using any computer-readable media that is accessible by computing device 200. Computer-readable media may include, for example, computer storage media such as memory 710 and communications media. Computer storage media, such as memory 710, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 710) is shown within the computing device 200 it will be appreciated that the storage may be distributed or located remotely and accessed via a network or other communication link (e.g. using communication interface 708).

Platform software comprising an operating system 712 or any other suitable platform software may be provided at the memory 710 of the computing device 200 to enable application software 714 to be executed on the device. The memory 710 can store executable instructions to implement the functionality of an object tracking engine 716, face tracking engine 718, graphics alignment/perspective correction engine 720, and lighting engine 722, as described above, when executed on the processor 702. The memory 710 can also provide a data store 724, which can be used to provide storage for data used by the processor 702 when controlling the augmented reality direct interaction environment.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An augmented reality system, comprising:
   an image sensor arranged to capture images of an object in a user-interaction region;
   a display device which is at least partially transparent and arranged to combine a displayed virtual environment with a view of the user-interaction region, such that both the virtual environment and the object are concurrently visible to a viewing user using the display device;
   a processor arranged to receive the images, calculate a corresponding position within the virtual environment that is visually aligned with position of the object when viewed by the viewing user using the display device, and control the display device to update the virtual environment based on the corresponding position to enable an interaction with the virtual environment by a touch or gesture of the user, the processor being further arranged to selectively control the display device to render black pixels at locations in the virtual environment that are coincident with at least one hand of the user.

2. An augmented reality system according to claim 1, wherein the object is a body part of the user.

3. An augmented reality system according to claim 1, further comprising a tracking sensor arranged to monitor at least one of an eye, face and head of the user, and wherein the processor is further arranged to use data from the tracking sensor to track the user's viewing position, and adapt the display of the virtual environment in dependence on the viewing position such that the virtual environment and the user-interaction region are visually aligned from the user's perspective.

4. An augmented reality system according to claim 1, further comprising a projector arranged to selectively project light into the user-interaction region responsive to commands from the processor.

5. An augmented reality system according to claim 4, wherein the projector is controlled by the processor to selectively omit lighting in one or more portions of the user-interaction region, such that the one or more portions are less visible to the user.

6. An augmented reality system according to claim 1, further comprising a light sensor arranged to provide an ambient light level measurement to the processor, and wherein the processor is further arranged to control an output light intensity value for the display device responsive to the ambient light level measurement.

7. An augmented reality system according to claim 1, wherein the display device comprises at least one of: a transparent organic light emitting diode display; a liquid crystal display; an organic light emitting diode display; a stereoscopic display; an autostereoscopic display; and a volumetric display.

8. An augmented reality system according to claim 1, wherein the display device is arranged to be switchable between a first state in which both the user-interaction region and the virtual environment is visible to the user, and a second state in which only the virtual environment is visible to the user.

9. An augmented reality system according to claim 1, wherein the display device comprises:
   a display screen arranged to display the virtual scene; and
   an optical beam splitter positioned to reflect light from the display screen and transmit light from the user-interaction region, such that both the virtual environment and the object are concurrently visible to a viewing user on the beam splitter.

10. An augmented reality system according to claim 9, wherein the display screen comprises a first portion and second portion; and
   wherein the display device further comprises:
      a half-silvered mirror positioned to reflect light from the first portion of the display screen; and
      a full-silvered mirror positioned to reflect light from the second portion of the display and through the half-silvered mirror, such that images shown on the first and second portions appear overlaid but at different depths when viewed by the user.

11. An augmented reality system according to claim 9, wherein the optical beam-splitter comprises a half-silvered mirror.

12. An augmented reality system according to claim 9, wherein the optical beam-splitter is arranged so that the user-interaction region is located between a table-top and the optical beam-splitter.

13. An augmented reality system according to claim 1, wherein the image sensor is a depth camera.

14. A computer-implemented method of direct user-interaction in an augmented reality system, comprising:
controlling, using a processor, an at least partially transparent display device to display a virtual environment combined with a view of a user-interaction region, such that both the virtual environment and an object are concurrently visible and visually aligned to a viewing user using the display device;
detecting movement of the object located in the user-interaction region using an image sensor;
generating a virtual representation of the object having a corresponding movement in the virtual environment that is visually aligned with the movement of the object when viewed by the viewing user using the display device;
updating the virtual environment using the display device such that the virtual representation interacts with one or more virtual objects in the virtual environment, such that, from the perspective of the user, the movement of the object viewed through the display device directly interacts with the one or more virtual objects in the virtual environment to enable an interaction with the virtual environment by allowing a touch or gesture of the user to manipulate the position of the one or more virtual objects; and
selectively controlling the at least partially transparent display device to render black pixels at locations in the virtual environment that are coincident with at least one hand of the user.

15. A method according to claim 14, wherein the virtual environment is a physics simulation-based user interface generated by the processor, and the virtual representation interacts with one or more virtual objects in the virtual environment by simulating forces imparted to the one or more virtual objects by the movement of the virtual representation.

16. A method according to claim 14, further comprising the step of the processor rendering the one or more virtual objects such that the virtual objects appear placed on top of the user-controlled object when viewed by the user on the display device, and the step of updating the virtual environment comprises moving the virtual objects in alignment with the movement of the user-controlled object.

17. A method according to claim 14, further comprising the step of receiving, at the processor, an image of the user's face from a tracking sensor, and determining the user's viewing position.

18. A method according to claim 17, wherein the step of controlling the display device comprises using the user's viewing position to visually align the virtual environment with the user-interaction region from the user's perspective.

19. A method according to claim 14, further comprising the step of the processor selectively controlling the display device to reduce the light emitted from at least a portion of the display device, such that a corresponding portion of the user-interaction region is more visible through the display device than surrounding portions.

20. An augmented reality system, comprising:
a display screen arranged to display a three-dimensional virtual environment comprising one or more virtual objects;
a depth camera arranged to capture depth images of a user-controlled object located within a user-interaction region;
a half-silvered mirror positioned to reflect light from the display screen and transmit light from within the user-interaction region, such that both the virtual environment and the user-controlled object are concurrently visible to the user using a surface of the half-silvered mirror;
a processor arranged to: control the display screen to display the virtual environment such that the virtual environment is visually aligned with the user-interaction region on a surface of the half-silvered mirror from the perspective of the user; receive the depth images and track movement of the user-controlled object in three dimensions in the user-interaction region; generate a virtual representation of the user-controlled object having a corresponding movement in the virtual environment that is visually aligned with the movement of the user-controlled object when viewed by the user on the half-silvered mirror; and update the virtual environment on the display screen such that the virtual representation interacts with the one or more virtual objects in the virtual environment, such that, from the perspective of the user, the movement of the user-controlled object viewed through the half-silvered mirror directly interacts with the virtual objects in the virtual environment to enable an interaction with the virtual environment by allowing a touch or gesture of the user to manipulate the position of the one or more virtual objects, the processor being further arranged to selectively control the display screen to render black pixels at locations in the virtual environment that are coincident with at least one hand of the user.

* * * * *